United States Patent
Matsumoto

[19]

[11] Patent Number: 6,125,028
[45] Date of Patent: Sep. 26, 2000

[54] INFORMATION PROCESSING SYSTEM

[75] Inventor: Tadashi Matsumoto, Tokyo, Japan

[73] Assignee: Canon Kabushiki Kaisha, Tokyo, Japan

[21] Appl. No.: 08/828,266

[22] Filed: Mar. 21, 1997

[30] Foreign Application Priority Data

Apr. 25, 1996 [JP] Japan ..................................... 8-105387
Jan. 28, 1997 [JP] Japan ..................................... 9-013939

[51] Int. Cl.$^7$ ....................................................... G06F 1/16
[52] U.S. Cl. ........................ 361/681; 248/920; 248/923; 312/223.3; 312/319.5; 361/683
[58] Field of Search ..................................... 361/681, 683, 361/686, 724–727; 364/708.1; 248/919, 920, 922, 923; 312/223.2, 223.3, 209, 249.8, 293.2, 322, 319.5, 319.6

[56] References Cited

U.S. PATENT DOCUMENTS 4,742,478  5/1988  Nigro, Jr. et al. ....................... 364/706
4,960,256  10/1990  Chihara et al. .......................... 361/681
5,345,362  9/1994  Winkler .................................... 361/681
5,548,478  8/1996  Kuma et al. ............................. 361/681
5,666,261  9/1997  Aguilera .................................. 361/681

*Primary Examiner*—Leo P. Picard
*Assistant Examiner*—Lisa Lea-Edmonds
*Attorney, Agent, or Firm*—Fitzpatrick, Cella, Harper & Scinto

[57] ABSTRACT

In an information processing system the inclination of a display unit can be varied, taking into account a platen for a scanner located in an upper area of the system. A variable inclination unit having a flat-panel display unit moves between a maximum inclination position and a minimum inclination position. A platen is located on the top of a main unit and can be opened or closed freely. The open or closed state of the platen is sensed by switches, whereby the movement of the variable inclination unit is controlled.

48 Claims, 12 Drawing Sheets

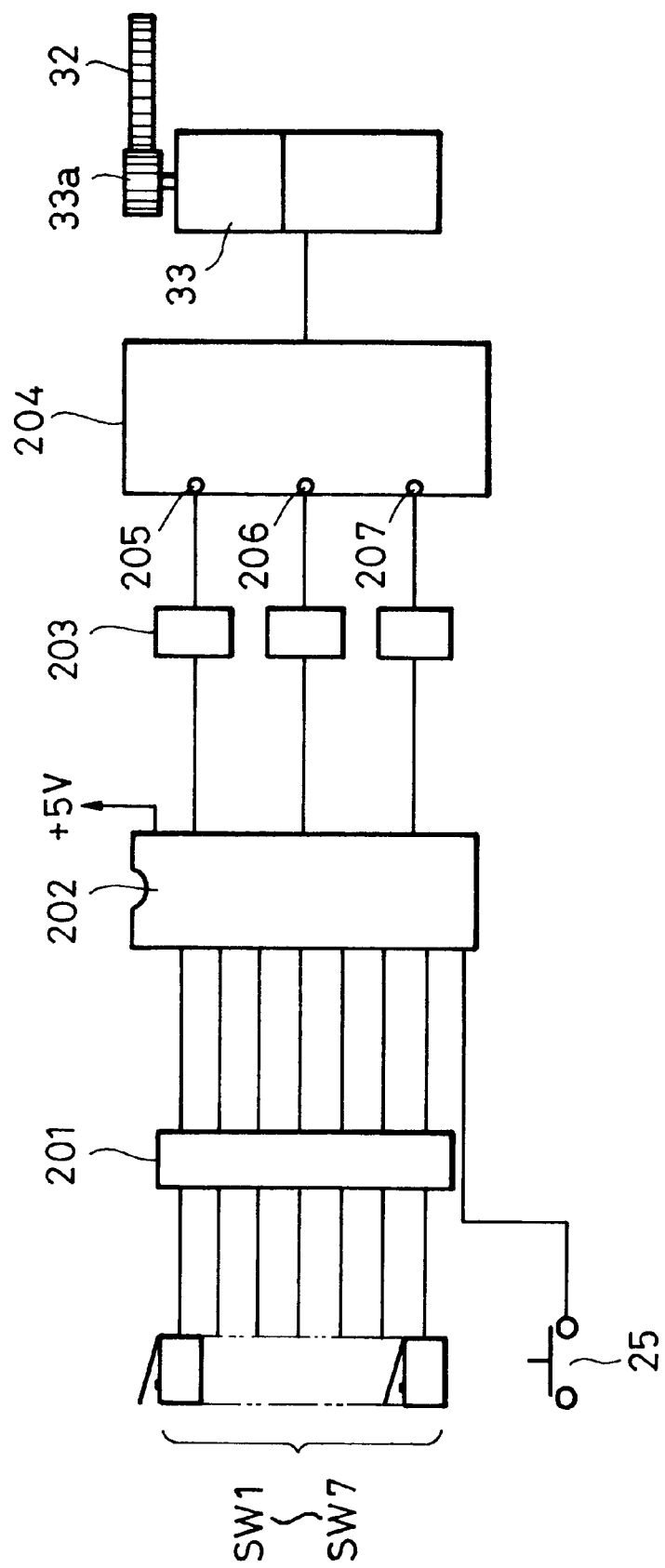

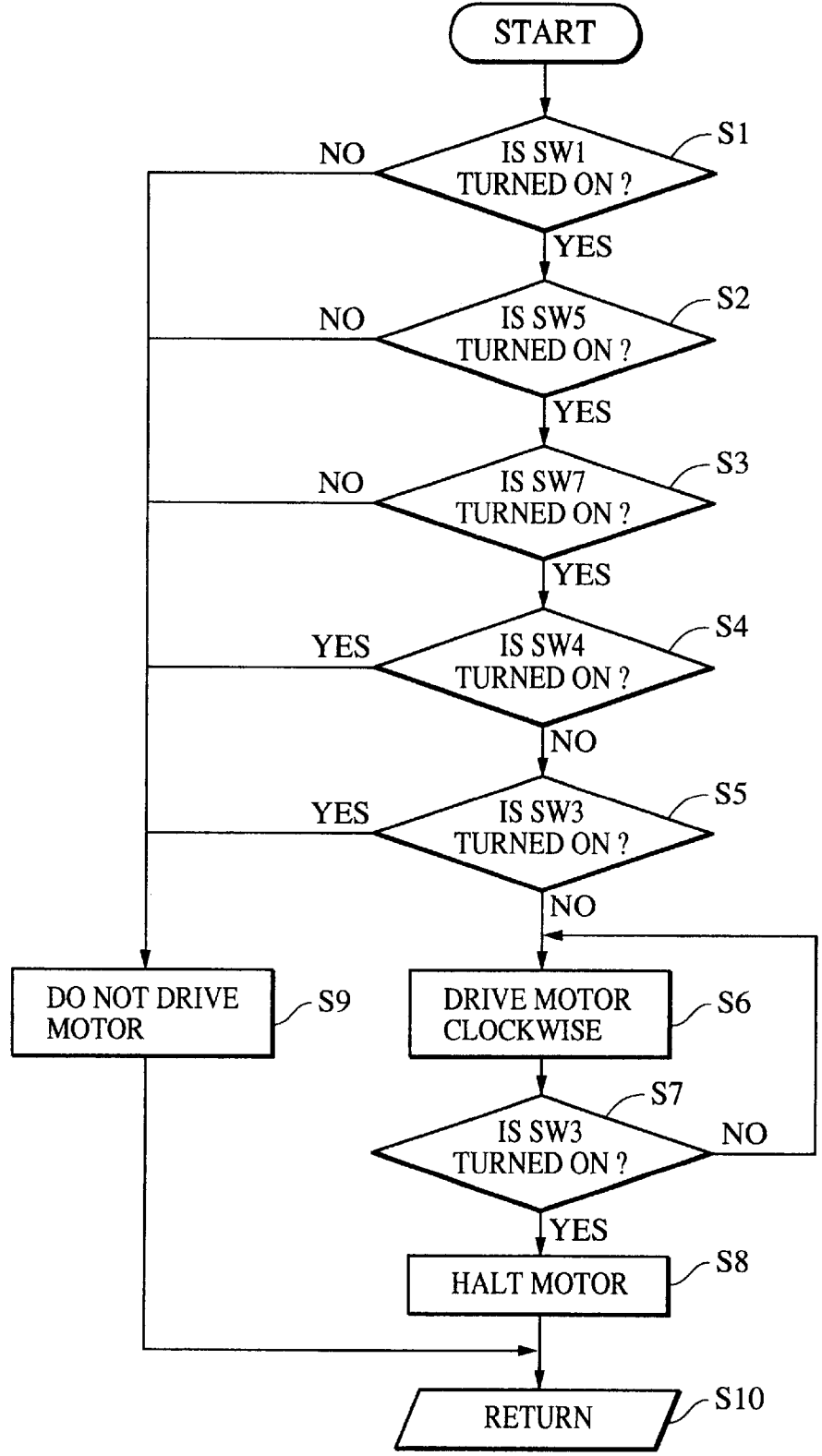

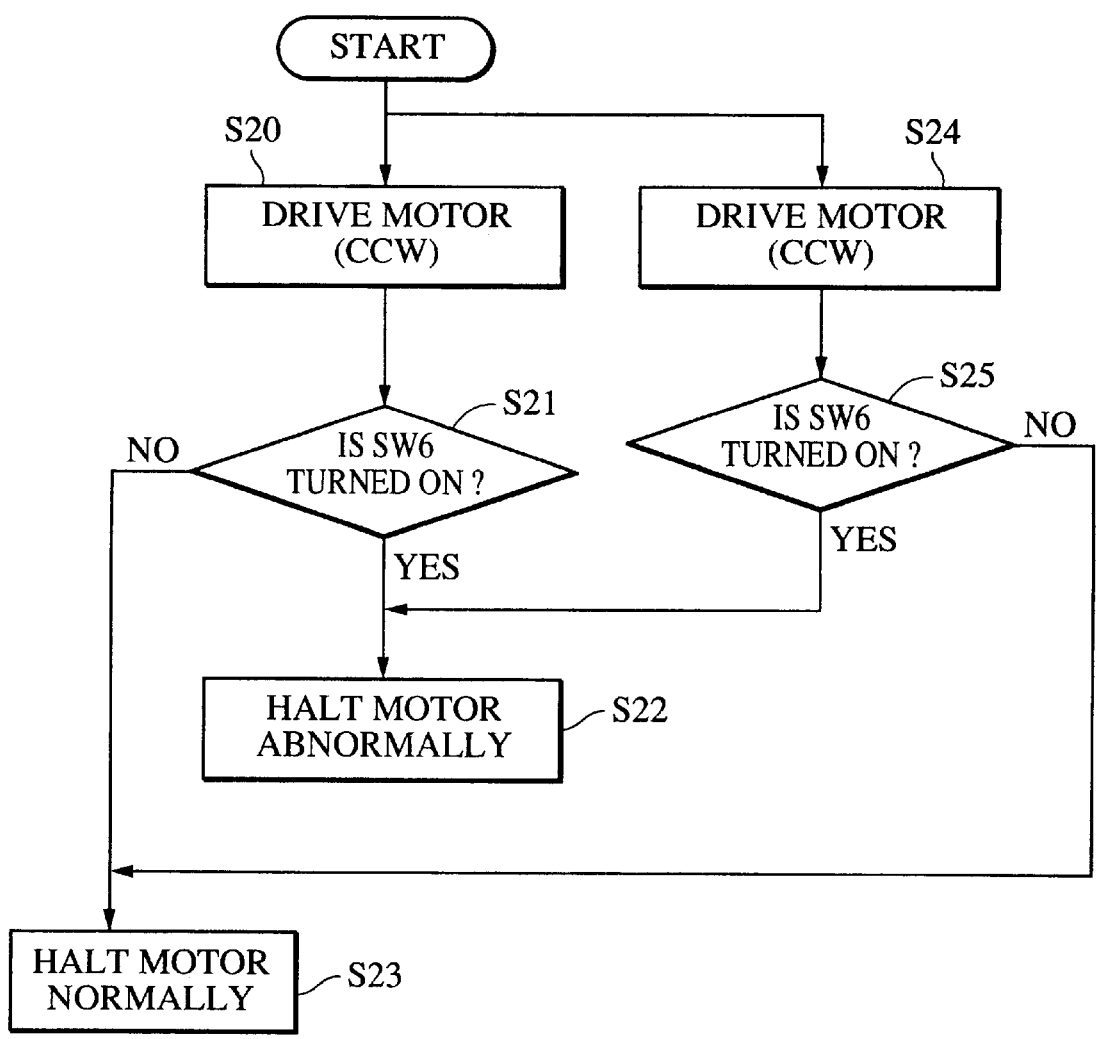

INFORMATION PROCESSING SYSTEM

BACKGROUND OF THE INVENTION

1. Field of the Invention

The present invention relates to an information processing system, or more particularly, to an information processing system in which a display unit moves between given positions.

2. Description of Related Art

With the recent advancement of an information system and its peripheral technologies, various information processing equipment has been developed. Now that the infrastructure of the information system that is a communications network such as an optical fiber network is completed, bidirectional transmission represented by the Internet is expected to be exploited fully. A feasible working mode of hardware of bidirectional transmission in which a communications facility of a personal computer with a display is used to make a connection to a communications line has already been implemented in part of the world, and is expected to evolve fruitfully in the future.

By the way, in bidirectional transmission using a personal computer, at least four different kinds of processing are needed: first processing which includes retrieving or obtaining a still image, color motion picture, character information, voice information, or the like desired by a user at the user's own charge by handling a keyboard, mouse, or the like of the personal computer and by paying a fee proportional to a line use time over a communications line, and then displaying the image or characters on a display screen and outputting the voice; second processing which includes inputting the thus obtained specific information to a magneto-optical disk unit or hard disk of the personal computer, or an external storage means such as a floppy disk unit; third processing which includes recording the desired image information on recording paper by means of a printer or copier so as to produce a hard copy; and fourth processing sending the still image, color motion picture, character information, voice information, or the like desired by the user to a partner.

By making the first to fourth processing feasible, the bidirectional transmission using a personal computer can be implemented in a data base retrieving system, facsimile system, color motion picture transmission/reception system, TV telephony system, TV conference system, factory management system, or the like. Multimedia communication of its original meaning can be realized.

Assuming that the first to fourth processing is carried out using a personal computer with a display, the first processing which includes accessing the Internet by handling a keyboard or mouse after making a connection to a communications line, receiving a desired image and voice, and displaying the image and outputting the voice, and the second processing which includes inputting the obtained given image and voice to an external storage unit such as a CD-ROM storage unit, can be carried out by assigning an image memory to an external storage means of a large storage capacity normally included in a personal computer. Therefore, the first and second processing can be carried out by, for example, one personal computer placed on a desktop.

However, for the remaining third processing which includes recording desired image information on recording paper so as to produce a hard copy, a separate color printer or copier is needed. It is therefore required to preserve an installation area. Moreover, for the fourth processing which includes sending a still image, motion picture, character information, voice information, or the like desired by a user to a partner, a video camera or still camera having a facility for converting image information into a digital image signal, an image reader such as a scanner capable of reading an original, and a microphone are needed.

As a result, when a personal computer is used as described above, since a color printer or copier is needed for carrying out the third processing and, a video camera or still camera, image reader, and microphone are needed for carrying out the fourth processing, a considerably large installation area is required. Moreover, the work of preparing these units individually and installing them must be processed. The bidirection transmission using a personal computer is therefore not feasible in practice.

Assuming that a personal computer with a display to be installed on a desktop is used, all operations are carried out by handling a keyboard or mouse, thus a beginner may find the handling annoying. Moreover, since the computer is installed on a desktop, a user must take a seat to handle the keyboard or mouse. Another working area to be occupied by a chair must be preserved.

If a flat-panel display having a flat display plane, which is locked in a variable inclination unit capable of varying an inclination thereof with respect to the top of a main unit of a system in back-and forth directions of the main unit and which is operated when touched directly, is installed and driven between a maximum inclination position and minimum inclination position, a compact and convenient system with improved handling efficiency can be configured.

However, for to realize the variable inclination unit, since a flat bed scanner for carrying out the fourth processing is located on the top of the main unit of a system, the flat-panel display unit must move above the scanner when guided and driven between the maximum inclination position and minimum inclination position. When the flat-panel display unit is located at the maximum inclination position, a platen can be opened or closed, and an image can be input using the scanner. When the flat-panel display unit is located at any position other than the maximum inclination position, the platen cannot be opened or closed and input using the scanner becomes impossible. In a composite machine capable of coping with multimedia communication, the use frequency of a scanner is low relative to those of diverse facilities. Even if the use frequency of a scanner is rather high, when a flat-panel display unit is positioned at an angle of maximum inclination, the scanner becomes usable. Once such a flat-panel display unit can be designed to be guided or driven between a maximum inclination position and minimum inclination position, an information processing system excellent in visibility and human engineering for normal use can be provided.

Moreover, since a flat-panel display unit itself has a large weight, a proportional driving force is applied to guide and drive the flat-panel display unit. When the flat-panel display unit is driven with the platen open, the flat-panel display unit and platen come into contact mutually. This may invite breakage or destruction of the platen or main unit of an information processing system.

The foregoing composite machine capable of coping with multimedia communication has come to be used as a public terminal placed in a public space such as a city hall, station, or event hall owing to a bidirectional transmission facility thereof to be linked to a communications line of a public network or the like. In such a case, a manager of the composite machine who maintains or manages the main unit does not always stay nearby but is engaged in maintenance when needed.

When the composite machine is installed in such a public space, the main unit thereof is locked. However, since a scanner or the like is located on the top of the main unit, even if the composite machine is unused, the scanner may be tinkered with and then broken and eventually, it may malfunction.

Moreover, there is the problem that when input handling is not performed, if various information such as publicity or advertisement is displayed on the flat-panel display unit of the composite machine, unless the display unit is located at the maximum inclination position, the display unit becomes invisible to the surroundings.

SUMMARY OF THE INVENTION

An information processing system of the present invention has been devised in consideration of the foregoing problems. An object of the present invention is to provide an information processing system which is user-friendly from the viewpoint of human engineering because the inclination of a display unit included in the information processing system can be varied and arranged to be usable by a standing user, and in which the heavy display unit can be driven safely and reliably without breakage or destruction of a platen or main unit.

In addition to the above object, another object of the present invention is to provide an information processing system making it possible to designate all processing with simple handling.

Yet another object of the present invention is to provide an information processing system for which components can be integrated into one unit for carrying out at least four different processing; first processing which includes outputting a desired image or voice, second processing which includes storing an image or voice in an external storage means, third processing which includes storing desired image information on a recording medium, and fourth processing which includes inputting a desired image or voice.

Still another object of the present invention is to provide an information processing system making it possible to remotely control movements of display units included in a plurality of information processing systems over communications lines such as a public network according to use situations, usages, or the like thereof.

Still another object of the present invention is to provide an information processing system making it possible that even when a plurality of information processing systems are installed in remote places in which no manager is present, since a plurality of display units included in the information processing systems can be moved and locked at minimum inclination positions by utilizing communications lines, platens thereof cannot be opened or closed and scanners can therefore be protected, and eventually the scanners can be prevented from being tinkered which and broken when processing facilities are halted.

For solving the above problems, an information processing system of the present invention has a display unit located on the top of the main unit, and comprises a base including the display unit, a guiding means for guiding the base between a first inclination position and second inclination position, a driving means for moving the base from one of the first inclination position and second inclination position to the other position, a sensing means for sensing a member coming into contact with the base when the base is moved, and a control means for controlling movement of the base on the basis of the result of sensing performed by the sensing means.

BRIEF DESCRIPTION OF THE DRAWINGS

FIG. 5 is a schematic block diagram of the limit switches SW1 to SW7;

FIG. 6 is a flowchart (neutral position) describing control of motor driving;

FIG. 7 is a flowchart (overrun) describing control of motor driving;

FIG. 8A is a side view of a major portion of the mechanism in a state in which a base 6 is raised, and FIG. 8B is a side view of the major portion in a state in which the base 6 lies at an inclined position;

DESCRIPTION OF THE PREFERRED EMBODIMENTS

Referring to the appended drawings, an embodiment of the present invention will be described below.

Figure 1:
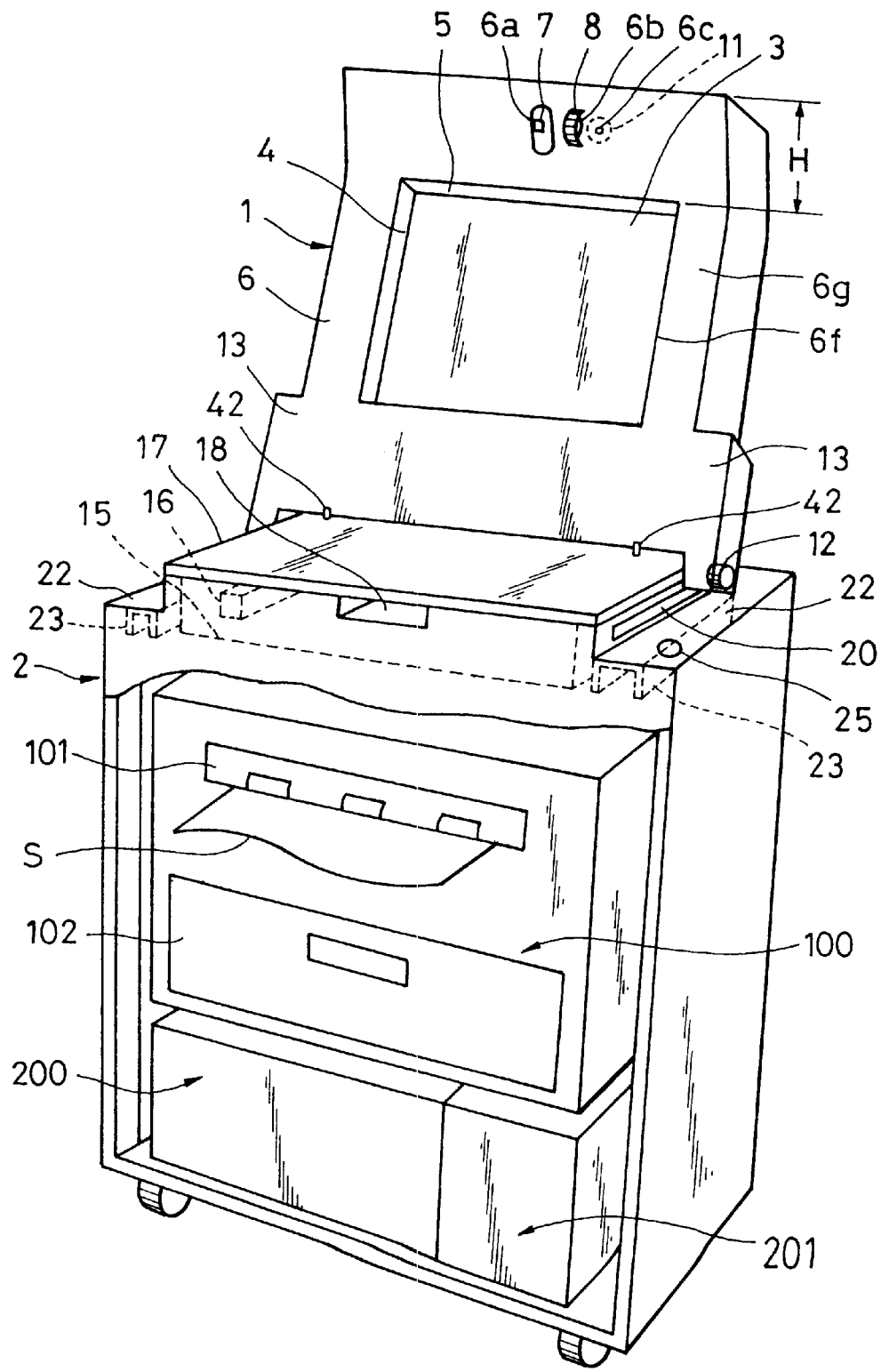
FIG. 1 is a perspective view of the appearance of an information processing system with a main unit thereof broken, showing a state in which a variable inclination unit 1 has moved to a maximum inclination position.
Figure 2:
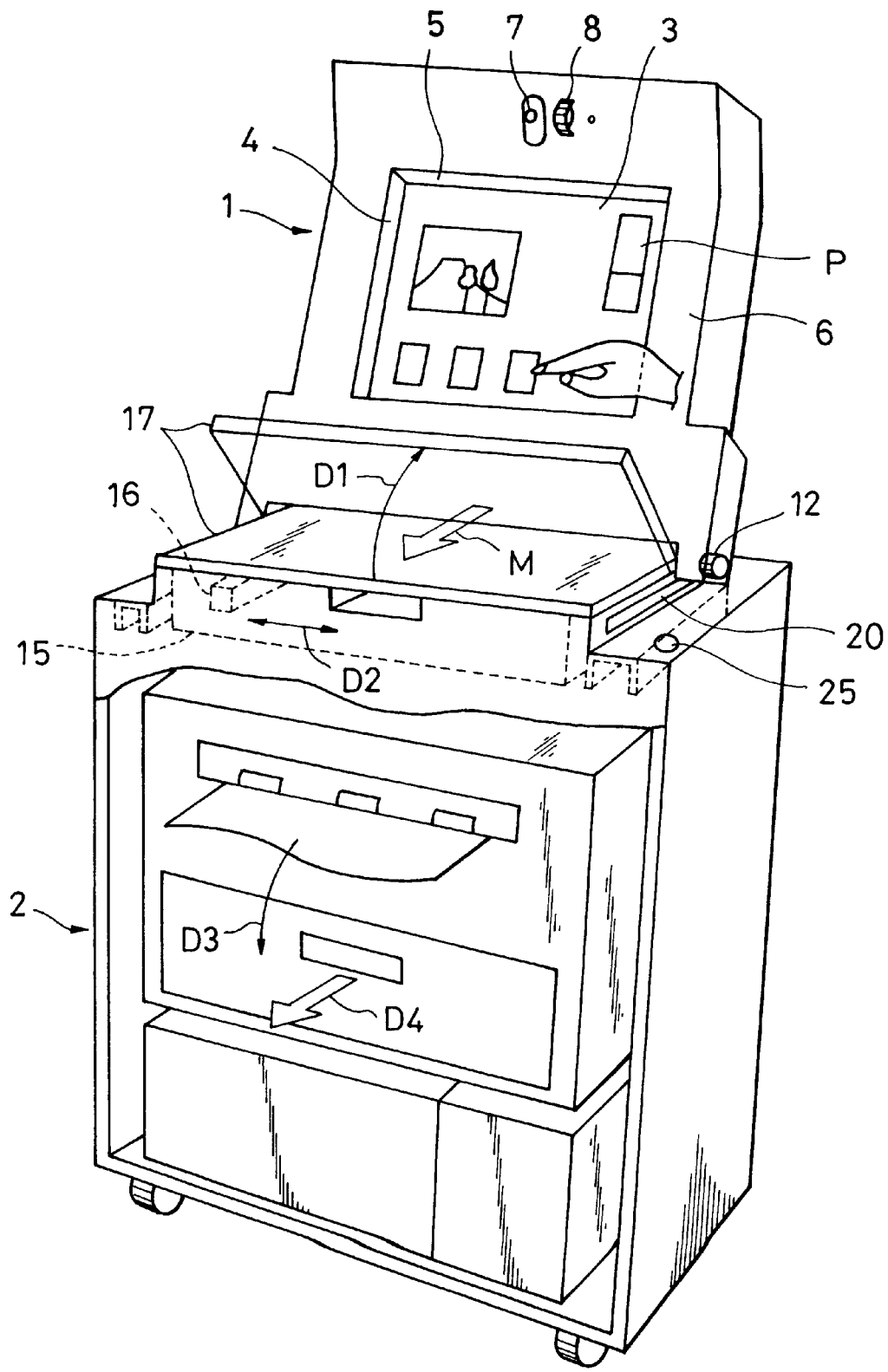
FIG. 2 is an explanatory diagram of a used state of the system shown in FIG. 1.

In FIGS. 1 and 2, a main unit 2 is a so-called floor installation type unit having casters for movement. When the main unit 2 is installed so that the height from the floor to a top 22 thereof ranges from 850 to 1000 millimeters, a user can use the system while standing up.

A platen 17 is located on a substantially central front side of the top 22 of the main unit 2 so that the platen 17 can open. In the main unit 2, a flat-bed scanner 15 of a flat-bed type having an original reading plane is incorporated.

As shown in FIG. 2, the platen 17 is designed to pivot in a direction of arrow D1 with respect to a hinge that is not shown when opened with a finger inserted into a concave part 18. After an original is set, the original is read by moving a close-contact type line sensor array 16, which is indicated with a dotted line, incorporated in the flat-bed scanner 15 also indicated with a dotted line, in a direction of arrow D2.

Guide grooves 20 are formed along right-hand and left-hand walls of the flat-bed scanner 15, thus forming a guiding unit for guiding guide studs 10 located in parallel with rollers 12 supported rotatably by roller supports 13 of the inclination variation unit 1 as described later.

Reinforcement members 23 indicated with a dotted line are located at right-hand and left-hand regions inside the top 22 near the guide grooves 20. A hard resin is used to make the reinforcement members 23 in order to ensure sufficient strength permitting the top 22 to receive weights applied to the rollers 12 to be rotated while also bearing the weight of the variable inclination unit 1.

Owing to the foregoing structure, when the rollers 12 run directly on the painted top 22, no running trace is left.

A color image formation unit 100 is incorporated in the main unit 2. The color image formation unit 100 can be pulled out in a direction of arrow D4 below the flat-bed scanner 15 that is the original reading means. Many sheets of a recording medium can be fed from a sheet cartridge 102 accommodating numerous sheets of a recording medium to the color image formation unit 100. Desired image information is printed and recorded on a sheet S serving as a recording medium in colors, and then output in a direction of arrow D3 through an ejection roller 101 located on the front side of the color image formation unit 100. The color image formation unit 100 is, for example, a unit adopting an electrophotographic recording method (laser beam printer) and using color toners of three elementary colors. The image formation unit 100 may be configured to adopt a heat transfer recording method or the like using a recording means or ink sheets and a thermal head instead of an ink-jet recording method. Either of the methods is selected according to the purpose of use. When a display unit is monochrome, a monochrome printer will do.

Located below the color image formation unit 100 are a CD-ROM storage unit 201 that is an external storage means for storing image information or voice information, a main control unit 200 responsible for control of the whole communication control unit in charge of communications with outside, and a power source (not shown). These components are stacked vertically, thus minimizing an occupied installation area.

An opening 6f is, as illustrated, formed in the base 6 of the variable inclination unit 1 capable of varying an inclination thereof with respect to the top 22 of the main unit 2 in back-and-forth directions along the main unit. A flat-panel display unit 3 having a flat display plane, for example, a ferroelectric liquid-crystal display (FLCD) unit, is exposed through the opening 6f.

Infrared sensors 4 and 5 for detecting an indicated position in a non-contact manner at a relatively low resolution of a 3-mm pitch, which are non-contact type touched position detectors for detecting a touched position on a display plane, are located at lateral and vertical positions on the margin of the opening of the flat-panel display unit 3 having the flat display plane. Unlike a tough-sensitive panel that is normally placed on a touched plane and designed for directly detecting a pressing movement, the flat-panel display unit fully optically detects a touched position. Unnecessary things are therefore not located on the flat display plane, whereby deterioration of display image quality is prevented, and a wasteful pressing force to be applied by a user for the pressing movement is lightened.

A slope 6g formed continuously to the base 6 so that it inclines a bit forward is formed within a range H above the opening 6f of the base 6 of the variable inclination unit 1. When the base 6 is set to a raised position as illustrated, a CCD (charge coupled device) camera 7 exposed through an opening 6a bored substantially in the center of the slope 6g faces a user. An adjustment knob 8 partly exposed through an elongated hole 6b is fixed to the axis of rotation of the CCD camera 7, so that the angle of the CCD camera 7 can be adjusted up and down. A through hole 6c through which voice passes to a microphone 11 indicated with a dashed line is bored on the right-hand side of the camera.

Owing to the foregoing structure, when an icon P appearing on the flat-panel display unit 3 is touched by a finger, the infrared sensors 4 and 5 on the margin of the opening sense the touch on the icon P. Thus, all relevant operations are carried out. The base 6 may be able to be halted at any position by handling the icon P.

The variable inclination unit 1 has a mechanism capable of moving responsively to the pressing of a start switch 25 located in the right-hand front region on the top 22 between a raised state that is an illustrated maximum inclination position, and a minimum inclination position that is a position to which the base 6 has the bottom thereof moved in a direction of arrow M on the platen 17 to hide the scanner 15, and at which touch handling and pen input handling can be performed easily and the scanner can be protected. The mechanism will be described in detail below.

Figure 3:
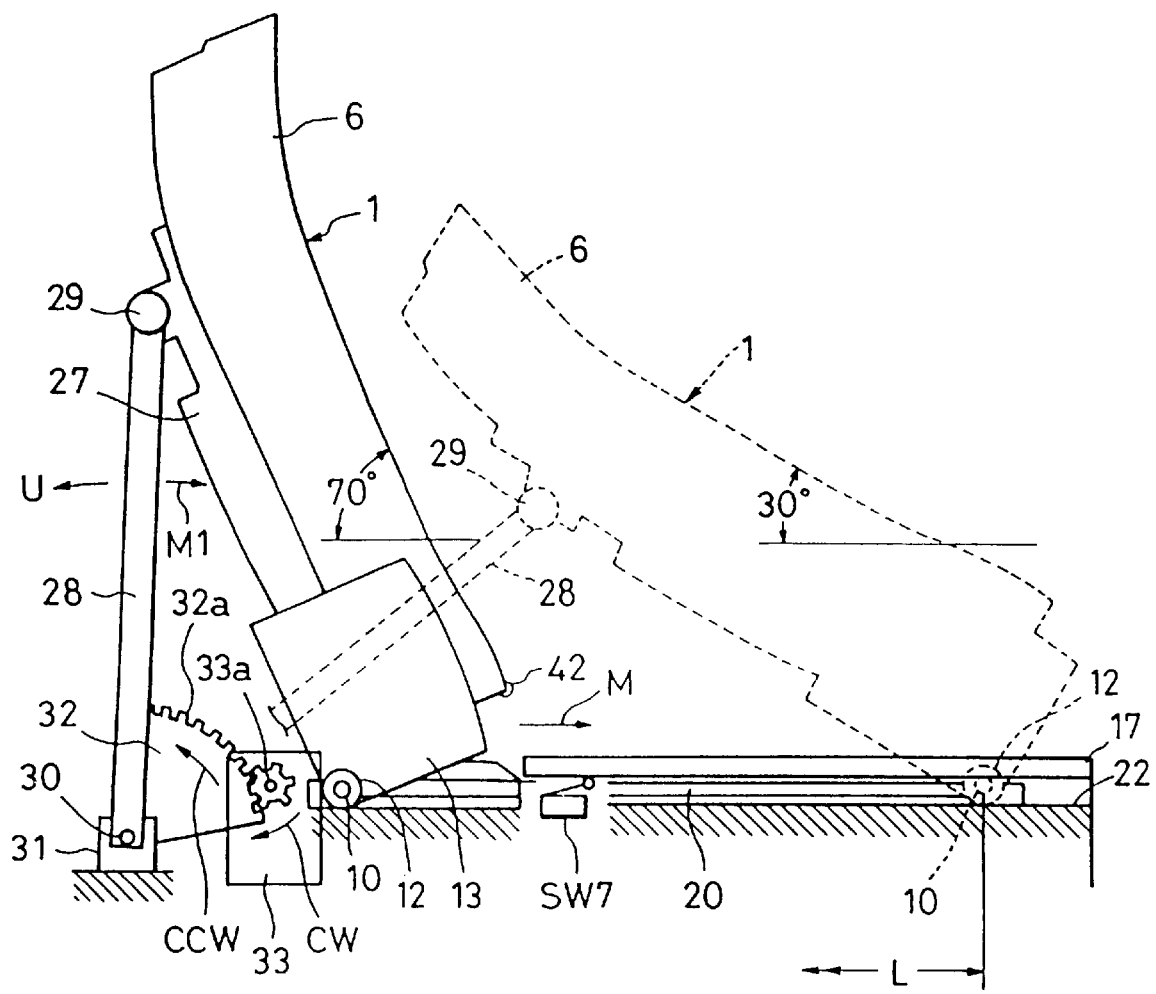
FIG. 3 is a left-hand side view schematically showing the configuration of the variable inclination unit 1.

In FIG. 3, the roller supports 13 are formed in the right-hand and left-hand lower regions of the base 6 so that the roller supports 13 cover the guide grooves 20 from outside. The pair of right-hand and left-hand rollers 12 are located at the corners of the roller supports 13 so that the rollers 12 can rotate freely. The rollers 12 roll on the top 22, thus supporting the variable inclination unit 1 between maximum and minimum inclination positions.

The guide studs 10 coaxial to the rollers 12 are sunk into the guide grooves 20, thus preventing lateral deflection from occurring when the variable inclination unit 1 moves in a direction of arrow M. When one of the guide studs 10 hits either of actuator blocks 35 movable within one of the guide grooves 20, any of the limit switches that will be described later is operated in order to prevent a further movement. With the hitting operation of the guide stud 10, the variable inclination unit 1 detects whether it is located at a maximum inclination position or minimum inclination position.

The maximum inclination position of the variable inclination unit 1 indicated with a solid line in FIG. 3 is a position at an angle of approximately 70° with respect to a horizontal plane. For setting the variable inclination unit 1 to the minimum inclination position indicated with a dotted line, the rollers 12 are moved by approximately 43 centimeters so that the variable inclination unit 1 is positioned at an angle of approximately 30° with respect to the horizontal plane for excellent touch handling of the display screen. The relationships in position and dimension among the base 6, support arm 28, and upper and lower fulcrums 29 and 30 are determined in with the angles.

The upper fulcrum 29 is located in an upper region on the back of the base 6. A lower fulcrum bracket 31 for bearing the lower fulcrum 30 is located in a deep region of the main unit. The support arm 28 is coupled to these fulcrums. The support arm 28 has a sector gear 32 whose center of rotation is the lower fulcrum 30 fixed thereto.

A drive motor 33 having an output gear 33a, which engages with teeth of a the sector gear 32, fixed to an output axis thereof and being driven to rotate forward or in reverse is fixed to the main unit and driven to rotate clockwise as illustrated. This causes the support arm 28 to pivot in a direction of arrow M1 and move the base 6 to a position indicated with a dotted line or to a position at which the base 6 covers the platen 17 of the scanner.

By contrast, when the base 6 is located at the position indicated with a dotted line, if the start button 25 is pressed, the drive motor 33 is driven to rotate counterclockwise. This causes the support arm 28 to pivot in a direction of arrow U and move the base 6 to a position indicated with a solid line. The base 6 is thus raised, and the scanner 15 becomes usable.

The base 6 thus moves on the platen 17 of the scanner. The maximum inclination position is set to behind a hinge, which is not shown, of the platen 17. When the base 6 is located behind the hinge, the platen 17 can be opened or closed.

Figure 4:
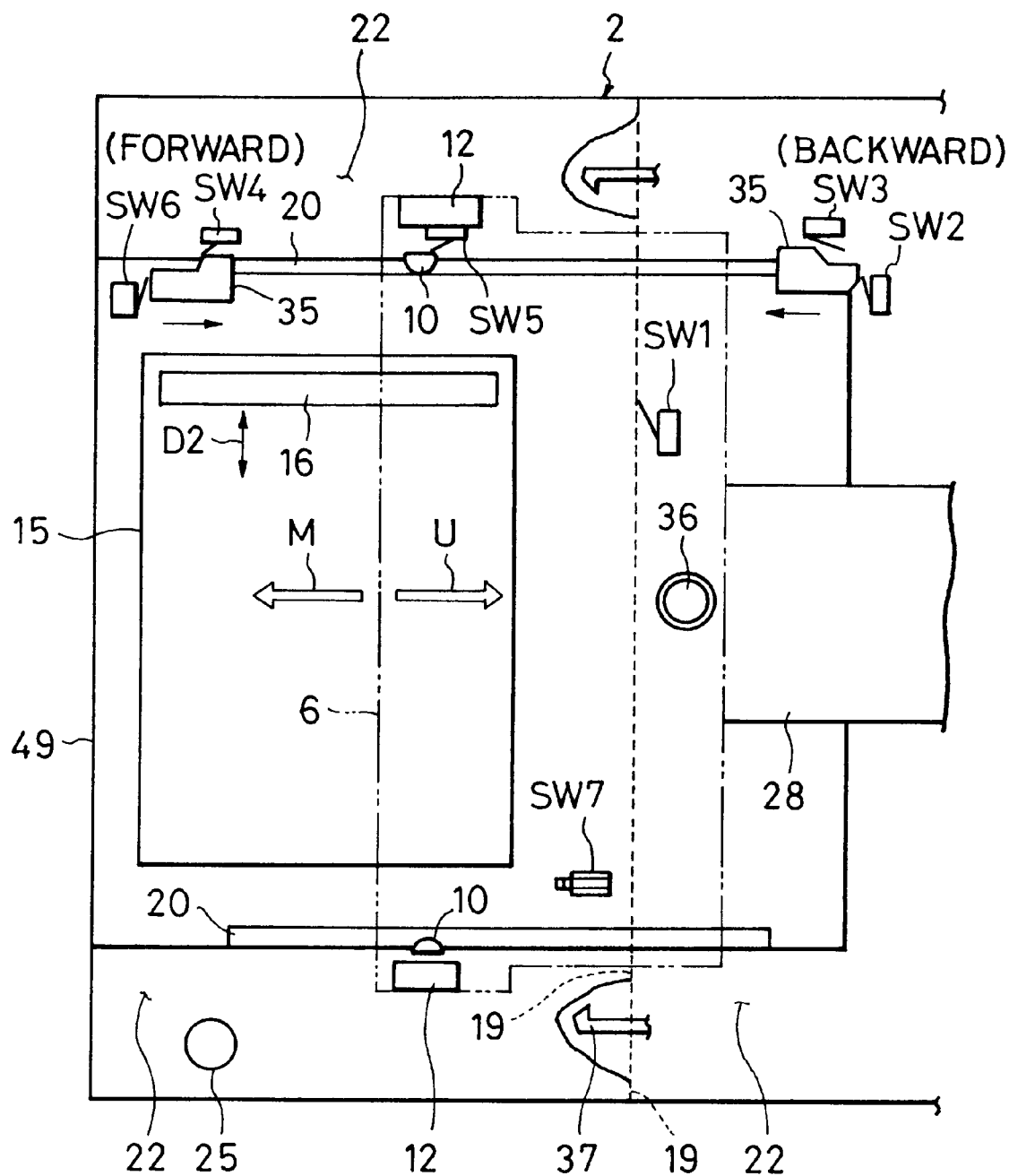
FIG. 4 is a plan view showing positions at which microswitches SW1 to SW7 that are limit switches are arranged.

In FIG. 4, the base 6 of the variable inclination unit 1 indicated with an alternate long and two short dashes line is moved forward or in a direction of arrow M and backward or in a direction of arrow U with the movement of the support arm 28 driven by the drive motor 33.

For detecting a position to which a movement is made, one of the guide studs 10 located in parallel with the rollers 12 in the right-hand and left-hand lower regions of the base 6 is run within one of the guide grooves 20. This causes the actuator blocks 35, which are constrained to move in directions of arrows in FIG. 4 by means of constraining members that are not shown, to move. Thus, a position to which a movement is made can be sensed.

The actuator blocks 35 are connected to a limit switch SW2 for sensing an overrun occurring when the base 6 withdraws, a rear-limit switch SW3 for detecting the fact that the base 6 withdrawing in a direction of arrow U is located at a raised position at an angle of 70°, a front-limit switch SW4 for sensing the fact that the base has advanced in a direction of arrow M and is located at an inclined position at an angle of 30°, a front-limit switch SW6 for sensing an overrun occurring when the base 6 advances, and a fit-limit switch SW5 for detecting whether or not the guide stud 10 is fitted in the guide groove 20 normally.

A front door 49 formed as part of the top 22 extending from a partition plane 19 so that it can be moved forward is moved forward when jamming occurs in the color image formation unit 100. Normally, the front door 49 is retained in a closed state by hooks 37. The hooks 37 are released by pressing a release switch 36 located at a lower deep end of the base 6. A door-limit switch SW1 is provided for detecting the open or closed state of the front door 49.

When the base 6 is located at a maximum inclination position, the platen 17 can be opened or closed. When the platen 17 is closed, if the start switch 25 is pressed, the base 6 moves from the maximum inclination position to a minimum inclination position. Consequently, the platen 17 or main unit may be broken or destroyed. For avoiding this, a platen open/close switch SW7 is provided for detecting the open or closed state of the platen 17.

Referring to FIG. 5, outputs of the limit switches SW1 to SW7 are converted into signals of processible voltage or current waves by a regulator IC 201, and then fed to a one-chip processor 202. The start switch 25 is connected to a brake terminal 205 of a motor driver 204, a forward/reverse rotation driving terminal 206 thereof, and a full halt terminal 207 thereof via photocouplers 203 over three signal lines for commanding driving of the drive motor 33 for forward rotation, driving thereof for reverse rotation, and a full halt of a brake.

In the above configuration, when a main switch of the main unit 2 is pressed, the one-chip processor 202 is initialized, and the states of the limit switches SW1 to SW7 are detected. When the base 6 of the variable inclination unit 1 is located at the maximum inclination position as indicated with a solid line (FIG. 3), the state is detected with the ON state of the rear-limit switch SW3. When the state is judged as a normal state, driving the drive motor 33 is not executed.

When the base 6 of the variable inclination unit 1 is located at the minimum inclination position as indicated with a dotted line (FIG. 3), the state is detected with the ON state of the front limit switch SW4. When the state is judged as a normal state, driving the drive motor 33 is not executed.

After the power supply is turned ON, if the variable inclination unit 1 must be moved from the position indicated with a solid line in FIG. 3 to the position indicated with a dotted line, or if the variable inclination unit 1 must be moved from the position indicated with a dotted line to the position indicated with a solid line, the start switch 25 is pressed. This causes the drive motor 33 to rotate forward or in reverse. The rear-limit switch SW3 is then turned OFF, and the front-limit switch SW4 is turned ON. Consequently, the variable inclination unit 1 is set to the minimum inclination position. A control program for controlling driving, so that after the front-limit switch SW4 is turned OFF, when the rear-limit switch SW3 is turned ON, the variable inclination unit 1 moves to the maximum inclination position, is written in advance in the one-chip processor 202.

When the power supply of the system is turned ON, if the variable inclination unit 1 is located at an intermediate position that is neither the position indicated with a solid line in FIG. 3 nor the position indicated with a dotted line, the variable inclination unit 1 is driven to either of the positions for the purpose of initialization.

If the drive motor 33 is driven abruptly, although the door-limit switch SW1 is turned OFF and the front door 49 is open, the variable inclination unit 1 may be driven. Moreover, although the guide studs 10 come off the guide grooves 20, if the variable inclination unit 1 is driven, lateral deflection occurring during movement of the base 6 may not be able to be restrained or prevented.

In such a case, control is given to carry out motor driving according to the flowchart of FIG. 6.

In the drawing, after the power supply of the system is turned ON and initialization is completed, it is judged at step S1 whether or not the door 49 is closed or the door-limit switch SW1 is turned ON. If the door-limit switch SW1 is turned OFF, control is passed to step S9. Motor driving is disabled. At step S10, control is returned.

By contrast, when the door-limit switch SW1 is turned ON, control is passed to step S2. It is then judged whether or not the fit-limit switch SW5 that indicates a normal state when the platen is closed properly is turned ON. If the fit-limit switch SW5 is turned OFF, control is passed to step S9. Motor driving is disabled. At step S10, control is returned.

When it is judged at step S2 that the fit-limit switch SW5 is turned ON and it is then judged at step S3 that the platen-open/close switch SW7 is turned ON, it is judged at step S4 whether or not the front-limit switch SW4 is turned ON. When the front-limit switch SW4 is turned ON, it means that the base 6 has advanced and is located at the minimum inclination position. Control is then passed to step S9. Motor driving is disabled. At step S10, control is returned.

At step S5, it is judged whether or not the rear limit switch SW3 is turned ON. When the rear-limit switch SW3 is turned ON, it means that the base has withdrawn and is located at the maximum inclination position. Control is passed to step S9. Motor driving is disabled. At step S10, control is returned.

By contrast, if it is judged at step S4 or S5 that the limit switch is turned OFF, it is judged that the variable inclination unit 1 is located at an intermediate position that is neither the position indicated with a solid line in FIG. 3 nor the position indicated with a dotted line. At step S6, the motor is activated to rotate clockwise. The clockwise rotation is continued until the switch SW3 is turned ON at step S7, and discontinued when the variable inclination unit 1 comes to a withdrawn position. Thus, the variable inclination unit 1 is halted at a home position indicated with a solid line in FIG. 3. Control is returned, and motor driving is terminated.

Owing to the aforesaid configuration, when the platen 17 is closed, the base 6 can move between the maximum inclination position and minimum inclination position without causing the platen 17 or main unit to break or be destroyed due to the contact between the base and platen 17.

If the base 6 moves beyond the switch SW3 or SW4 because the drive motor overruns for some reason, as described in the flowchart of FIG. 7, one of the guide studs 10 located in parallel with the rollers 12 in the right-hand and left-hand lower regions further moves the actuator blocks 35. Consequently, the back-limit switch SW2 or the front-limit switch SW6 which senses an overrun occurrence when the base 6 advances, is turned ON (steps S21 and S25). At step S22, forcibly halting the drive motor 33 is executed. An abnormal halt flag derived from an abnormal halt is set in a memory (not shown) by the microprocessor 202. The subsequent processing is terminated forcibly. As described above, the drive motor 33 to be driven could perfectly cope with an abnormal run if the abnormal run should occur.

Figure 8A:
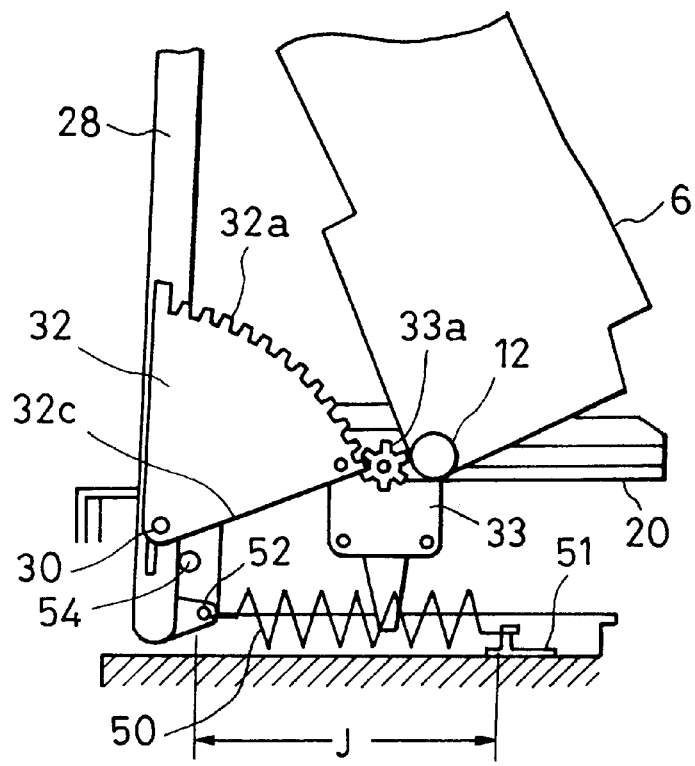
FIGS. 8A and 8B are side views showing an auxiliary mechanism used when a driving motor 33 is activated.

When the drive motor 33 is activated in the state shown in FIG. 8A, since the weight of the base 6 itself is applied, a very large load is not imposed on the drive motor 33. The drive motor 33 operates as a motor brake in a final driven state. For driving the base 6 from the position indicated with a dotted line in FIG. 3 to the position indicated with a solid line, when the the drive motor 33 is activated at the position shown in FIG. 8B, the drive motor 33 requires a torque of 100 kgF (kilogram-force) for activation.

The support arm 28 is extended downward beyond the lower fulcrum 30 and provided with a hook 52 for locking one end of a tension coil spring 50. A hook 51 is fixed to the main unit, and a tension coil spring 50 is laid so that an overall length thereof becomes length K in a tense state. Another tension coil spring 50 that is not shown is laid so that an overall length thereof becomes length K in a tense state and length J in a natural state.

Figure 8B:
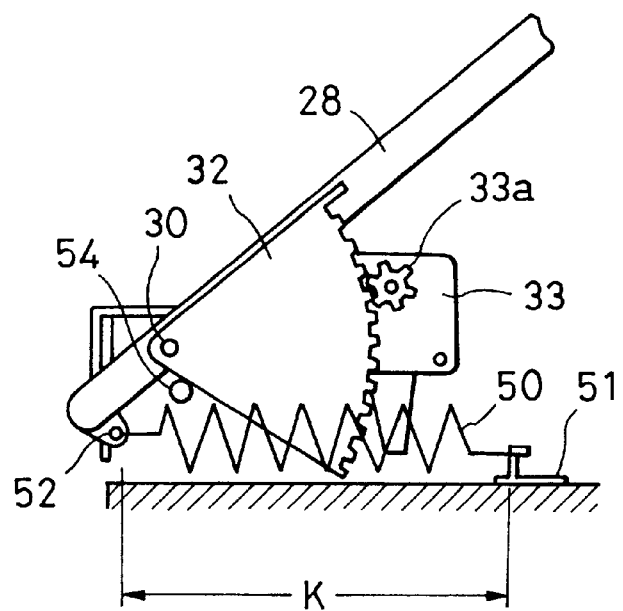

Owing to the foregoing structure, a maximum load occurring when the base 6 of the variable inclination unit is located at the minimum inclination position in FIG. 8B is reduced due to a tensile force of the tension coil spring 50. Thus, a load on the drive motor 33 is reduced. This makes it possible to design the drive motor 33 compactly. Moreover, a plurality of tension coil springs 50 are juxtaposed as a tension means, whereby a desired tensile force can be exerted within a limited space.

A pin is formed on an edge 32c of the sector gear 32 so that the pin hits a stopper pin 54 fixed to the main unit 2 at a position shown in FIG. 8B to which the support arm 28 pivots, and thus restrains the support arm 28 from further pivoting. Thus, in addition to the foregoing overrun prevention motor control, a purely mechanical overrun prevention facility is included.

Figure 9:
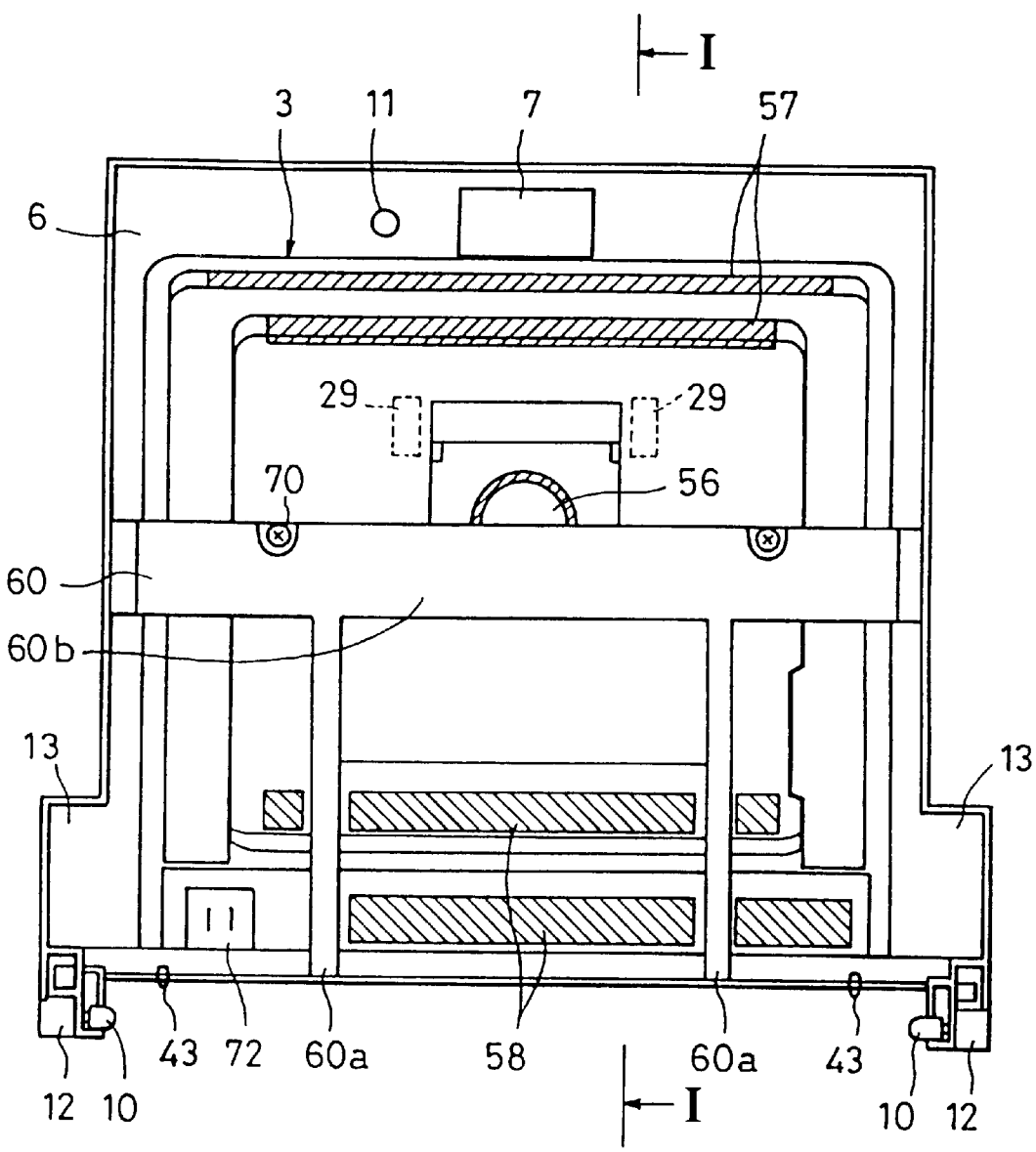
FIG. 9 is a back view of a flat-panel display unit 3 fixed to the base 6.
Figure 10:
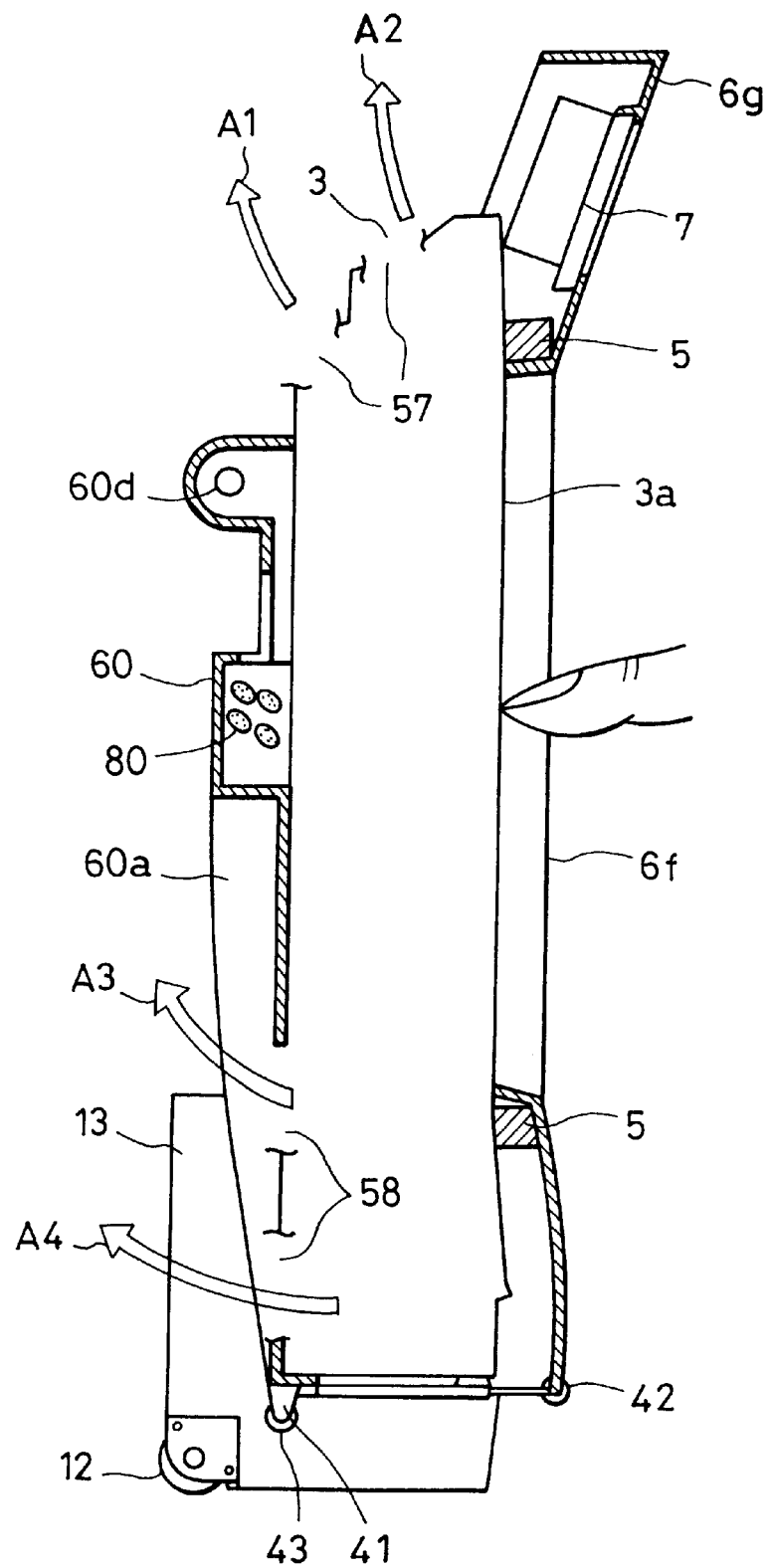
FIG. 10 is an a cross-sectional view a long lines I—I of FIG. 9.

In FIGS. 9 and 10, components that have already been described are assigned the same reference numerals. The description of the components will be omitted. Constituent features alone will be described.

A back-light causing a large heat dissipation is incorporated in the flat-panel display unit 3, and illuminates a liquid-crystal screen, which does not have the ability to glow, from the back of the liquid-crystal screen. A plurality of upper heat radiation holes 57 are bored in two rows in the back and top of the display unit.

A plurality of lower heat radiation holes 58 are, as illustrated, bored in two rows in the lower region of the back. When the base 6 is raised, heated air gets out through the heat radiation holes 57 and 58 (A1 to A4). Thus, the flat-panel display unit 3 is configured as a so-called spontaneous heat radiation type unit.

By the way, the flat-panel display unit 3 itself has a weight of about 15 kilograms. Sufficient mechanical strength must therefore be ensured for guiding or driving the flat-panel display unit 3 between the maximum inclination position and minimum inclination position. A base frame 60 made by welding and machining an aluminum material so that the base frame has a shape suitable for bearing the whole weight of the flat-panel display unit 3 and preserving as illustrated the heat radiation holes 57 and 58 is fixed to the back of the flat-panel display unit 3 using a screw 70 and others.

The base frame 60 is welded and secured so that right-hand and left-hand arms 60a extend from a transverse member 60b. A support hole 60d used to support the aforesaid upper fulcrum is formed as part of the base frame 60. A space in which cables 80 are stowed is formed inside the transverse member 60b, and a receptacle 72 enabling sole use of the flat-panel display unit 3 is formed in the lower part of the back of the flat-panel display unit 3.

As shown in FIG. 10, a pair of right-hand and left-hand front-end rollers 42 are located at the lower corners of the face of the base 6, and a pair of right-hand and left-hand back-end rollers 43 are located at tips of convex parts 51 of the lower corners of the back of the base 6.

Owing to the foregoing structure, even when any control facility fails and the platen 17 is not closed, if the base 6 starts moving from the maximum inclination position to the minimum inclination position, after the base 6 and platen 17 come into contact, the platen 17 is pushed by either the front-end rollers 42 or back-end rollers 43. The rollers slide to move on the platen 17, whereby the platen 17 is closed along with the movement of the base but will not be damaged. Consequently, breakage or destruction of the platen 17 or main unit can be prevented.

Alternatively, the rollers may not be used but the curves R of the lower ends of the face and back of the base are made larger so that the lower ends can slide over the platen.

Thus, a display unit can be mounted on the top of a scanner having a platen using a simple structure.

Figure 11:
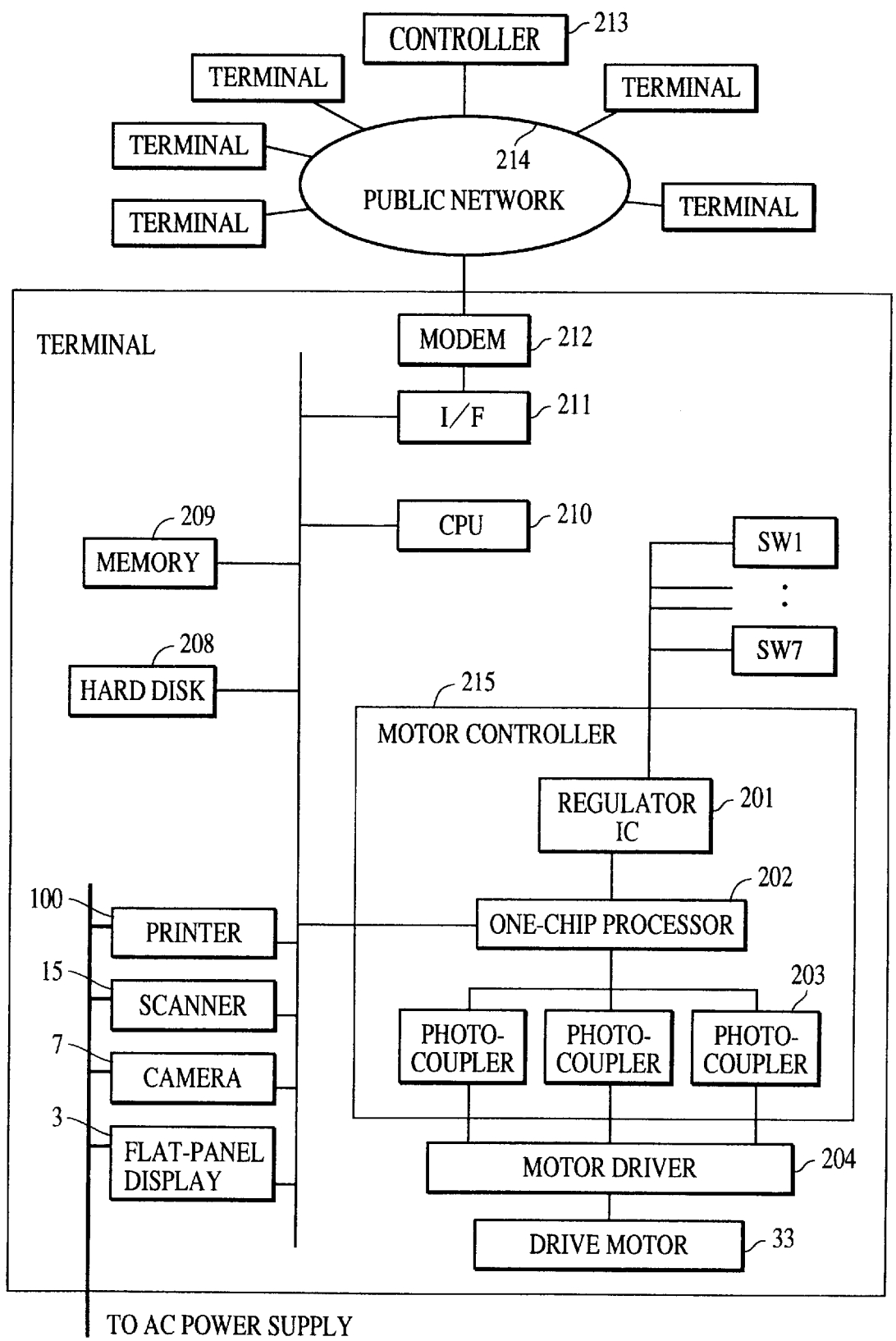
FIG. 11 is a block diagram of a system in which a plurality of information processing systems are linked to a public network.

When the illustrated system in FIG. 11 is configured, each of the composite systems capable of carrying out the first to fourth processing can be used as a data base retrieving system, facsimile system, motion picture transmission/reception system, TV telephone system, TV conference system, factory management system, or the like. Multimedia communication by its original meaning can therefore be realized. The details of the system will be described.

In FIG. 11, the sensors SW1 to SW7 for detecting the position or state of the base 6 of the variable inclination unit so as to help the base 6 move are connected to a motor controller 215 composed of the regulator IC 201, one-chip processor 202, and photocouplers 203. The motor controller 215 is connected on a bus in a main control unit 200. Also connected on the bus are a hard disk 208 serving as a main memory for storing various kinds of data and programs, a central processing unit (CPU) 210 for processing input data or output data, and controlling the units in a terminal, a memory 209 for temporarily storing data to be processed or processed by the CPU 210, and an interface (RS-232C in this embodiment) 211 for transferring data to or from outside, and the printer 100, scanner 15, camera 7, and flat-panel display unit 3 constituting the terminal.

The terminal is connected on a public network 214 via the interface 211 and a modem 212 and capable of transmitting or receiving information to or from outside. A plurality of composite systems serving as terminals are interconnected on the public network 214, and can bidirectionally communicate information or data over communications lines.

Control given from a controller connected on a communications line of a public network or the like to variable inclination units of a plurality of composite systems will be described.

Herein, a controller 213 is realized by installing processing programs in a personal computer, workstation, or the like. The description of the physical configuration of the controller will be omitted.

The controller 213 connected on the public network 214 selects terminals whose variable inclination units are to be controlled. A variable inclination unit control instruction (signal) is sent to the selected terminals according to a predetermined protocol. A signal transmitted over the public network 214 is received by the modem 212 in the main control unit 200 in each terminal. The received instruction is saved temporarily in the memory 209 in the main control unit 200 via the interface 211. The saved instruction is analyzed by the CPU 210. Various kinds of variable inclination unit control programs stored in the hard disk in advance are read, and executed and processed by the CPU 210. According to the programs, the CPU 210 controls the motor controller 215 as mentioned above so as to move the base 6.

The controller 213 may not send an instruction to terminals successively but may send it to all the terminals connected on the public network 214 at one time.

In response to a main unit facility halt instruction transmitted from the controller 213 according to a predetermined protocol (TCP/IP), the CPU 210 reads and executes a main unit facility halt program stored in the hard disk 208. In this embodiment, the terminals are presumably used as street terminals each having the facility of an Internet server. The main unit facility therefore means facilities except the facility necessary for the server.

Figure 12:
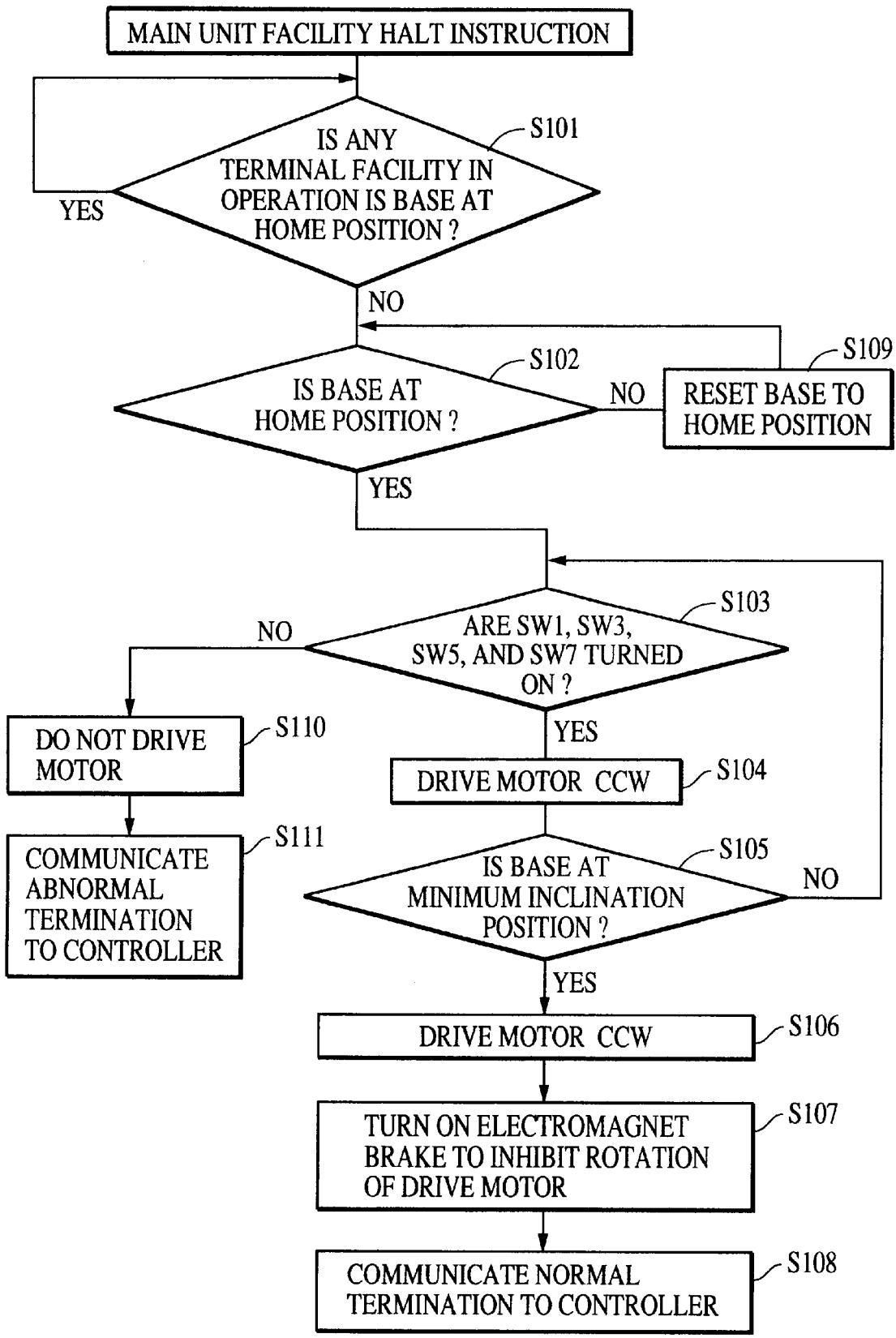
FIG. 12 is a flowchart describing a processing procedure to be carried out when an information processing system receives a facility halt instruction over a public network.

In FIG. 12, first, the CPU 210 checks if the facilities constituting a terminal are in operation (step S101). If an operation such as printing or inputting from the display unit is recognized, the CPU 210 stands by until the operation terminates (until the operation becomes unrecognizable).

If it is recognized at step S101 that no operation is in progress, the CPU 210 issues an instruction to the motor controller 215 so as to instruct the motor controller 215 to reset the base 6 to the home position. The one-chip processor 202 carries out the processing described in the flowchart of FIG. 5 (step S209).

When resetting the base 6 to the home position is terminated or terminated abnormally before coming to an end (for example, when motor driving is disabled in FIG. 5), the motor controller 215 returns the situation to the CPU 210.

If a returned signal is an abnormal signal, the CPU 210 suspends the processing of the program according to the program, and communicates to the controller 213 the fact that the terminal facility halt instruction has terminated abnormally. If the base 6 is reset to the home position normally, an instruction for instructing movement to the minimum inclination position is sent from the CPU 210 to the motor controller 215.

In response to the instruction, the one-chip processor 202 executes movement from the home position (maximum inclination position) to the minimum inclination position.

After the front-limit switch SW4 is turned ON, if movement terminates normally (Yes at step S105), the motor controller 215 sends a normal termination signal to the CPU 210. Control is then passed to the next step. If the movement does not terminate normally, an abnormal termination signal is sent to the CPU 210. The terminal facility halt program is suspended. The CPU 210 communicates to the controller 213 the fact that the terminal facility halt instruction has terminated abnormally.

If the variable inclination unit moves to the minimum inclination position normally, the CPU 210 sends a lock instruction to the motor controller 215. In response to the instruction, the one-chip processor 202 instructs the motor driver 204 to turn ON the electromagnetic brake. The drive motor 33 is then inhibited from rotating (step S107). The base 6 is locked at the minimum inclination position.

Next, according to the terminal facility halt program, the power supplies of the facilities except the facility of a server are turned OFF. The power supplies of the units of the facilities such as the printer, scanner, camera, and flat-panel display can be turned ON or OFF in response to an instruction from the CPU. After movement to the minimum inclination position is terminated normally, the CPU 210 outputs a power supply OFF instruction to the units of the facilities. In response to the power supply OFF instruction, the units turn OFF the power supplies thereof. If the power supplies are not turned OFF normally, the units each output a signal saying that fact to the CPU 210. When this signal is not output after the passage of a given time, the CPU 210 judges that the power supplies are turned OFF normally, and communicates to the controller 213 the fact that the terminal facility halt instruction has terminated normally.

If the terminal facility halt instruction does not terminate normally, the CPU 210 suspends terminal facility halt and communicates to the controller 213 the fact that the terminal facility halt instruction has terminated abnormally.

As mentioned above, an instruction issued from the controller 213 is received over a public network. Bases including flat-panel displays are moved to the minimum inclination positions. Composite systems installed in a plurality of remote places then have facilities thereof except the facility of a server terminated. Thereafter, scanners located on the tops of the main units will not be tinkered with and broken leading to eventual malfunction. Moreover, unnecessary power will not be consumed.

In this embodiment, a facility halt instruction has been described. For supplying information to remote places by sending display information to the plurality of composite systems, when the composite systems are not handled, the bases of the composite systems may be raised at an angle of a maximum inclination in order to supply information. Assuming that a TV telephone or the like is used for a reception job, a base of a composite system may be set to a position suitable for the contents of a job used by a visitor by a receiving side.

The present invention may be adapted to a system composed of a plurality of equipment including a host computer, interface, printer, and the like or to an apparatus formed with one piece of equipment such as a copier. Moreover, needless to say, the present can be adapted to a system or apparatus in which programs are installed in order to control operating units. In this case, the programs expressed by software for achieving the present invention are read from a storage medium into the system or apparatus, whereby the system or apparatus enjoys the advantages of the present invention.

As described so far, according to the present invention, the inclination of a display unit included in an information processing system can be varied.

According to the present invention, there can be provided an information processing system which is user-friendly from the viewpoint of human engineering because the system can be used by a standing user, and in which a display unit can be driven reliably without breakage or the like of a platen or main unit.

Moreover, there can be provided an information processing system not only providing the above advantage but also making it possible to designate any kind of processing through simple handling.

There can be provided an information processing system in which processing units responsible for at least different kinds of processing such as, first processing of outputting a desired image or voice, second processing of storing an image or voice in an external storage means, third processing of storing desired image information on a recording medium, and fourth processing of inputting a desired image or voice can be integrated into one unit.

Furthermore, there can be provided an information processing system making it possible that even when a plurality of information processing systems are installed in remote places in which no manager exists, since the display unit of one such information processing system or the display units of a plurality of such information processing systems can be moved and locked at a given position or given positions by utilizing a communication line or communications lines, a scanner or scanners and the like located below the display unit or display units can be protected.

What is claimed is:

1. An information processing system comprising:
   a main unit,
   a display unit located on top of said main unit,
   variable inclination means capable of varying an inclination of said display unit, with said variable inclination means including:
      a base;
      guiding means for guiding said base between a first inclination position and a second inclination position; and
      driving means for moving said base between the first inclination position and the second inclination position
      wherein said guiding means includes:
         rollers located on said base for rolling along said top of said main unit and for supporting said variable inclination means between the first inclination position and the second inclination position;
         a coupling arm member coupled to an upper fulcrum on said base and a lower fulcrum on said main unit; and
         guide studs located in parallel with said rollers, wherein said guide studs are guided along lateral guide grooves in said top of said main unit.

2. An information processing system according to claim 1, wherein said driving means includes a sector gear having said lower fulcrum as a center of rotation and fixed to said coupling arm member; and
   a drive motor, having an output gear and a sector gear fixed to an output axis thereof, driven to rotate forward or in reverse, and fixed to said main unit.

3. An information processing system according to claim 1, further comprising a position detecting means for detecting the presence or absence of one of said guide studs at both ends of one of said lateral guide grooves.

4. An information processing system according to any of claims 1 to 3, wherein said main unit includes:
   original reading means having an original reading plane exposed on said top of said main unit for handling an original from the front side of the system;
   image formation means, located below said reading means, for recording desired image information on a recording medium and ejecting a resultant record;
   external storage means for storing image information or voice information;
   communication control means responsible for communications with or from outside sources; and
   main control means connected to said display means, original reading means, image formation means, external storage means, and communication control means for controlling the information processing system.

5. An information processing system, comprising:
   a main unit;
   a display unit located on top of said main unit,
   variable inclination means capable of varying an inclination of said display unit, said variable inclination means including:
      a base;
      guiding means for guiding said base between a first inclination position and a second inclination position, said guiding means being located on both sides of a lower portion of said display unit;
      driving means for moving said base between the first inclination position and the second inclination position, said driving means including a gear assembly and a rotatable arm connected to a back portion of said display unit; and
      a base frame formed on a back of said display unit in order to ensure heat radiation from said display unit.

6. An information processing system according to claim 5, wherein said guiding means guides said base in back-and-forth directions along said main unit.

7. An information processing system according to claim 5, wherein said display unit has a flat display plane and includes a touched position detecting means for detecting a touched position on said display plane.

8. An information processing system according to claim 7, wherein said touched position detecting means is a non-contact type detecting means located on the margin of said flat display plane, and prevents deterioration of display image quality.

9. An information processing system according to claim 5 or 6, wherein said base frame is made of a lightweight metal and formed to pass cables of said display means internally.

10. An information processing system according to any of claims 5 to 7, wherein said main unit includes:
    original reading means having an original reading plane thereof exposed on said top of said main unit for handling an original from the front side of the system;
    image formation means, located below said reading means, for recording desired image information on a recording medium and ejecting a resultant record;
    external storage means for storing image information or voice information;
    communication control means responsible for communications with or from outside sources; and main control means connected to said display means, original reading means, image formation means, external storage means, and communication control means, and responsible for controlling the information processing system.

11. The information processing system according to claim 5, wherein said driving means further includes a motor driving said gear assembly.

12. An information processing system comprising:
a main unit;
a display unit located on top of said main unit,
variable inclination means capable of varying an inclination of said display unit, said variable inclination means including:
  a base;
  guiding means for guiding said base between a first inclination position and a second inclination position;
  driving means for moving said base between the first inclination position and the second inclination position; and
  at least one of mechanical safety means included in said guiding means for restraining said base from moving beyond said second inclination position, and electrical safety means connected to said driving means for restraining said base from being driven beyond said second inclination position.

13. An information processing system according to claim 12, wherein said guiding means guides said base in back-and-forth directions along said main unit.

14. An information processing system according to claim 11 or 12, wherein said display unit has a flat display plane and includes a touched position detecting means for detecting a touched position on said display plane.

15. An information processing system according to claim 12 or 13, wherein said guiding means includes:
  freely rotating rollers located on said base for rolling along said top of said main unit and supporting said variable inclination means between the first inclination position and the second inclination position; and
  a coupling arm member coupled to an upper fulcrum on the back of said base and a lower fulcrum located on said main unit,
  wherein said mechanical safety means includes:
    a first locking member, located at said upper fulcrum, for locking said base when said base moves beyond the first inclination position; and
    a second locking member, located at said lower fulcrum, for locking said base when said base moves beyond the second inclination position,
  wherein said driving means includes:
    a sector gear having said lower fulcrum as a center of rotation and fixed to said coupling arm member; and
    a drive motor having an output gear thereof to be engaged with said sector gear fixed to an output axis thereof, driven to rotate forward or in reverse, and fixed to said main unit,
  and wherein when said electrical safety means detects when said base is driven beyond said second inclination position, said electrical safety means halts said drive motor.

16. An information processing system according to claim 12 or 13, wherein said main unit includes:
  an original reading means having an original reading plane thereof exposed on said top for handling an original from the front side of the system;
  image formation means, located below said image reading means, for recording desired image information on a recording medium and ejecting a resultant record;
  external storage means for storing image information or voice information;
  communication control means responsible for communications with or from outside sources; and
  main control means connected to said display means, original reading means, image formation means, external storage means, and communication control means for controlling the information processing system.

17. An information processing system comprising:
a main unit;
a display unit on top of said main unit;
a base;
guiding means for guiding said base between a first inclination position and a second inclination position;
driving means for moving said base between the first inclination position and the second inclination position;
sensing means for sensing a member coming into contact with said base when said base is moved; and
control means for controlling movement of said base on the basis of the result of sensing by said sensing means.

18. An information processing system according to claim 17, wherein when said sensing means senses a member coming into contact with said base, said control means disables said base from moving beyond said first inclination position.

19. An information processing system according to claim 17, further comprising an original reading unit, wherein said member is a platen on said original reading unit.

20. An information processing system according to claim 19, further comprising moving means for moving said platen to a state in which said platen does not come into contact with said base, even when there is movement of said base.

21. An information processing system according to claim 20, wherein said moving means is formed with rollers.

22. An information processing system according to claim 19, further comprising a printer.

23. An information processing system according to claim 22, wherein said original reading unit is located on said printer, and said display unit is located above said original reading unit.

24. An information processing system according to claim 22, further comprising a communications facility.

25. An information processing system according to claim 24, further comprising a reception facility for receiving an external signal via said communications facility.

26. An information processing system according to claim 25, wherein said control unit gives control according to an instruction contained in a received signal.

27. An information processing system according to claim 25, wherein said control means moves said base to the first inclination position in response to a received external signal.

28. An information processing system according to claim 27, wherein said base is locked at said first inclination position.

29. An information processing system according to claim 25, wherein said control means moves said base to said second inclination position after moving it to said first inclination position in response to a received external signal.

30. An information processing system according to claim 17, wherein said display has a flat display plane and includes a touched position detecting means for detecting a touched position on said display plane.

31. An information processing system according to claim 17, wherein said display unit is formed with a ferroelectric crystal-display panel.

32. An information processing system according to claim 17, further comprising instructing means for instructing said driving means to start movement of said base.

33. An information processing system according to claim 17, wherein the first inclination position is a maximum inclination position, and the second inclination position is a minimum inclination position.

34. An information processing system according to claim 17, wherein said display unit is visible externally whether said base is located at either the first inclination position or the second inclination position.

35. A display unit mounting assembly, comprising:
a display unit;
a variable inclination mounting assembly for mounting said display unit, with said mounting assembly including:
a base supporting said display unit;
guiding means for guiding said base between a first inclination position and a second inclination position, said guiding means being located on both sides of a lower portion of said display unit; and
driving means for moving said base between the first inclination position and the second inclination position, said driving means including a gear assembly and a rotatable arm connected to a back portion of said display unit.

36. A display unit mounting assembly according to claim 35, further comprising a base frame formed on a back of said display unit in order to ensure heat radiation from said display unit.

37. A display unit mounting assembly according to claim 35, wherein said display unit is visible externally whether said base is located at either the first inclination position or the second inclination position.

38. A display unit mounting assembly according to claim 35, wherein said guiding means includes mechanical safety means with a first locking member for locking said base when said base moves beyond the first inclination position and a second locking member for locking said base when said base moves beyond the second inclination position.

39. A display unit mounting assembly according to claim 35, wherein said guiding means includes electrical safety means for halting drive of said base when said electrical safety means detects that said base has been driven beyond the second inclination position.

40. A display unit mounting assembly according to claim 35, wherein said guiding means includes freely rotating rollers located on said base for rolling and supporting said variable inclination mounting assembly between the first inclination position and the second inclination position.

41. A display unit mounting assembly according to claim 40, wherein said guiding means includes guide studs, located in parallel with said rollers, for guiding along lateral guide grooves positioned at said base.

42. A display unit mounting assembly according to claim 35, wherein said guiding means includes a coupling arm member coupled to an upper fulcrum on said base and a lower fulcrum located below said upper fulcrum.

43. A display unit mounting assembly according to claim 42, wherein said driving means includes a sector gear having said lower fulcrum as a center of rotation and fixed to said coupling arm member.

44. A display unit mounting assembly according to claim 43, wherein said driving means includes a drive motor having an output gear thereof to be engaged with said sector gear fixed to an output axis thereof, driven to rotate forward or in reverse.

45. The display unit mounting assembly according to claim 34, wherein said driving means further includes a motor driving said gear assembly.

46. An information processing system, comprising:
a main unit;
a display unit located on top of said main unit, said display unit including:
a flat display plane;
touched position detecting means for detecting a touched position on said display plane, wherein said touched position detecting means is a non-contact type detecting means located on a margin of said flat display plane, and prevents deterioration of display image quality; and
variable inclination means capable of varying an inclination of said display unit, said variable inclination means including:
a base;
guiding means for guiding said base between a first inclination position and a second inclination position, said guiding means located on both sides of a lower portion of said display unit;
driving means for moving said base between the first inclination position and the second inclination position, said driving means including a gear assembly and a rotatable arm connected to a back portion of said display unit; and
a base frame formed on a back of said display unit in order to ensure heat radiation from said display unit.

47. A display unit mounting assembly, comprising:
a display unit;
a variable inclination mounting assembly for mounting said display unit, with said mounting assembly including:
a base supporting said display unit;
guiding means for guiding said base between a first inclination position and a second inclination position, said guiding means including:
electrical safety means for halting drive of said base when said electrical safety means detects that said base has been driven beyond the second inclination position; and
driving means for moving said base between the first inclination position and the second inclination position.

48. A method of moving a display unit in an information processing system comprising a main unit and with the display unit located on top of the main unit, said method comprising the steps of:
moving the display unit between a first inclination position and a second inclination position along guiding means for guiding the display unit between the first inclination position and the second inclination position in accordance with an instruction to move the display unit;
detecting whether or not the display unit reaches the first inclination position or the second inclination position by a sensor; and
stopping the movement of the display unit when the sensor detects that the display unit reaches the first inclination position or the second inclination position.

* * * * *

UNITED STATES PATENT AND TRADEMARK OFFICE
CERTIFICATE OF CORRECTION

PATENT NO. : 6,125,028
DATED : September 26, 2000
INVENTOR(S) : Tadashi Matsumoto It is certified that error appears in the above-identified patent and that said Letters Patent is hereby corrected as shown below:

Column 1,
Line 38, "processing" should read -- processing which includes --.

Column 3,
Line 53, "which" should read -- with --.

Column 9,
Line 20, "SW6" should read -- SW6, --.

Column 15,
Line 32, "11 or 12," should read -- 12 or 13, --.

Column 18,
Line 4, "claim 34," should read -- claim 35, --.

Signed and Sealed this

Thirtieth Day of October, 2001

Attest:

NICHOLAS P. GODICI
Attesting Officer  Acting Director of the United States Patent and Trademark Office